A. X. PFEIFFER.
TIRE ARMOR.
APPLICATION FILED DEC. 12, 1918.
1,300,766.
Patented Apr. 15, 1919.
3 SHEETS—SHEET 3.
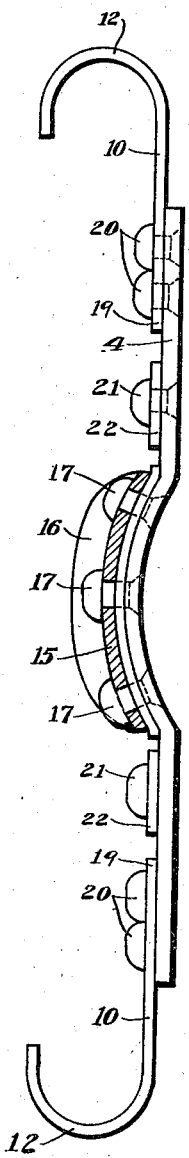
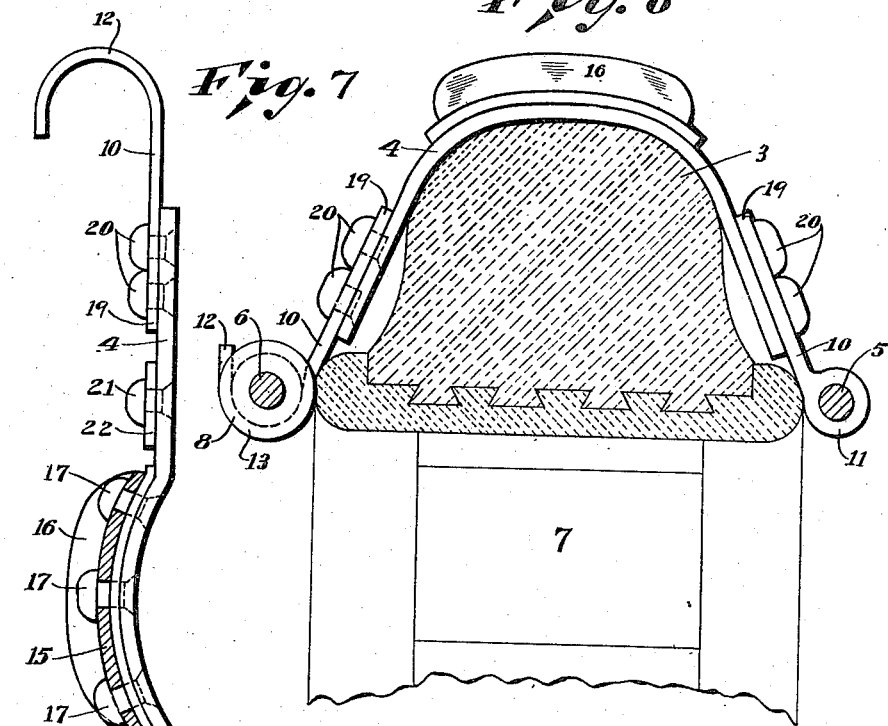
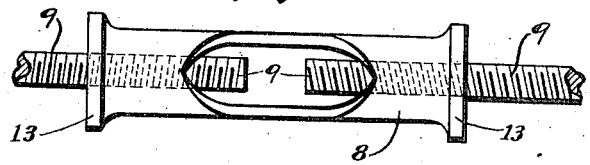
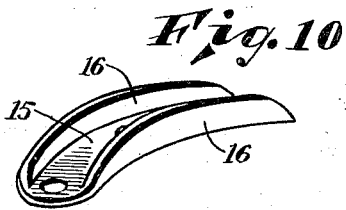
INVENTOR:
Adolph X. Pfeiffer,
BY
Hugh K. Wagner,
ATTORNEY.

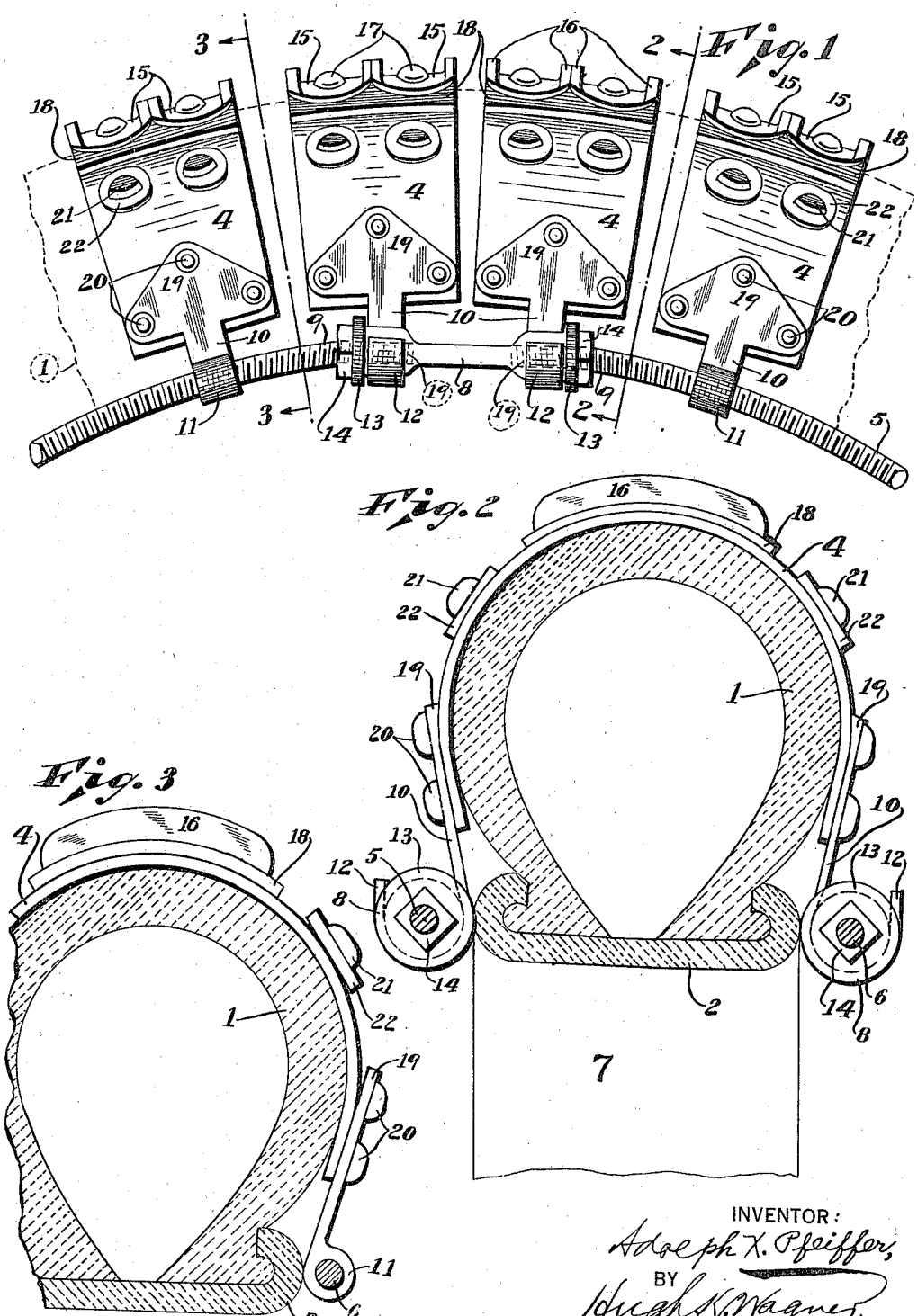

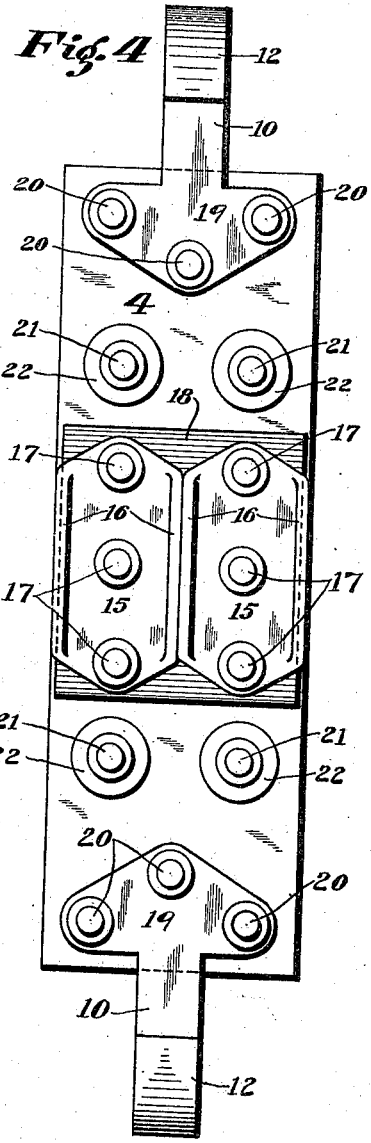
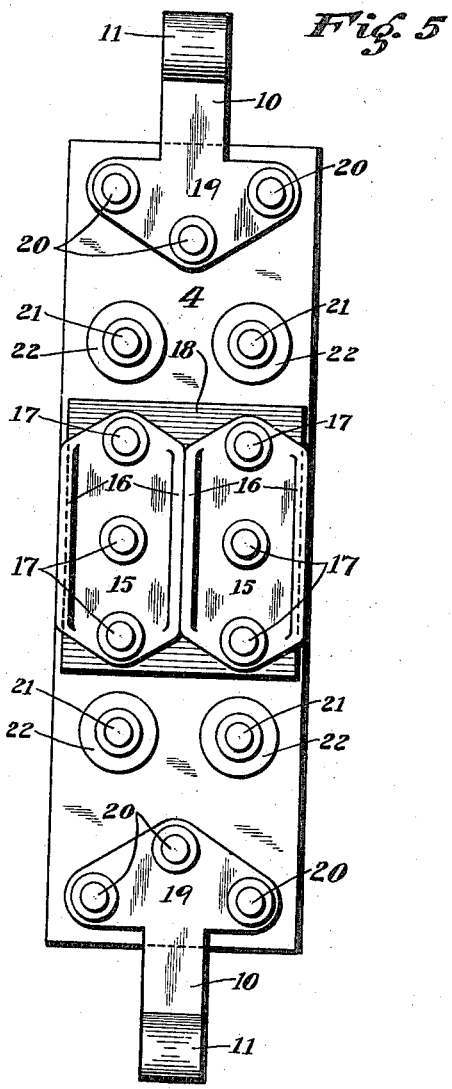
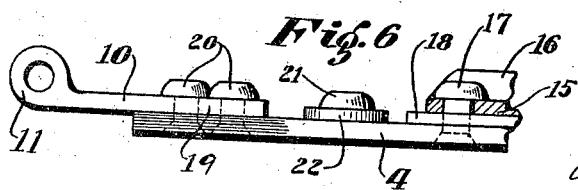

UNITED STATES PATENT OFFICE.

ADOLPH X. PFEIFFER, OF ST. LOUIS, MISSOURI.

TIRE-ARMOR.

1,300,766.

Specification of Letters Patent.

Patented Apr. 15, 1919.

Application filed December 12, 1918. Serial No. 266,430.

*To all whom it may concern:*

Be it known that I, ADOLPH X. PFEIFFER, a citizen of the United States, residing at the city of St. Louis, in the State of Missouri, have invented certain new and useful Improvements in Tire-Armor, of which the following is a specification.

This invention relates to armor for the tires of motor vehicles or the like, and has for its object the simplification and lightening of such devices.

One of the many objects of this invention furthermore is so to attach the armor to the tire or wheel that pieces of the attaching means will not fall on the road when running on a flat tire. The loss of such pieces from some similar structures results in extra expense.

Other objects of this invention are to provide tire armor that is reliable and efficient for its purpose, that is easily applied to the tire, the creepage of which is limited or prevented, and which enables the use, almost indefinitely, of a casing that is practically worn out.

In the accompanying drawings forming part of this specification, in which like numbers of reference denote like parts wherever they occur.

Figure 1 is a fragmentary side elevation of a wheel with this tire armor attached, showing the same at the turnbuckle, or means for joining the ends of the circumferential locking means;

Fig. 2 is a sectional view on the line 2—2 in Fig. 1 looking in the direction indicated by the arrows;

Fig. 3 is a sectional view on the line 3—3 in Fig. 1 looking in the direction indicated by the arrows;

Fig. 4 is a plan view of one of the units located near the turnbuckle;

Fig. 5 is a plan view of one of the units located elsewhere than at the turnbuckle;

Fig. 6 is a fragmentary side elevation of the device shown in Fig. 5;

Fig. 7 is a side elevation of the device shown in Fig. 4;

Fig. 8 is a sectional view similar to Fig. 3, or showing this armor applied to a solid tire, whereas in Figs. 2 and 3 the same is shown in connection with a pneumatic tire;

Fig. 9 is a detail of the turnbuckle on an enlarged scale; and

Fig. 10 is a perspective view of one of the armor plates.

The casing 1 may be of any ordinary or desired kind, but is shown in the drawings as of the clencher variety, held in the rim 2 in the customary manner. This armor may be used to protect a solid tire 3, such as depicted in Fig. 8.

The armor consists of a series of armor units 4, of which but a few samples are shown in Fig. 1, it being understood that similar units are mounted on and held by rods 5 and 6 around the entire circumference of the wheel 7.

Rod 5 is threaded throughout its length, but rod 6 is not so threaded, but is threaded only at its opposite ends adjacent to the turnbuckle 8. The turnbuckle 8 is shown in Fig. 9 in a position at a right angle to the position of the same in Fig. 1. In Fig. 9 the rods upon which the turnbuckle 8 is screwed, may be either rod 5 or rod 6. It will be understood that the rod shown in Fig. 9 is bent into circular form and that it is opposite ends of the same rod that appear in Fig. 9. The same remark is true concerning rod 5 in Fig. 1. The turnbuckle 8 screws upon the threads 9 on either rod 5 or rod 6 in a well understood manner, and draws the opposite ends of the rod on which it is placed, toward each other and very tightly, with the result of decreasing the circumference of the circle described by its rod and thereby tending to draw such rod into a position adjacent to, or in contact with the rim 2 as shown in Figs. 2, 3, and 8.

Each unit 4 of armor is provided with a pair of oppositely extending straps 10 terminating in eyes 11, except the two units 4 located opposite the turnbuckles 8 (there being one such turnbuckle 8 for each of the rods 5 and 6), which last mentioned units are provided with hooks 12, which encircle the turnbuckles 8 in the manner best seen in Fig. 1.

The interior of each eye 11, in a row on one side of the wheel, is threaded for engagement with the threads on rod 5, but the similar eyes 11 upon the other end of the units 4 and forming a row on the opposite side of the wheel, are not threaded, but unthreaded rod 6 is passed through the said unthreaded eyes 11 and its ends are fastened together by turnbuckle 8.

If desired, both rods 5 and 6 may be threaded, one with a right hand thread, and the other with a left hand thread. The object of threads upon either or both of these rods is to prevent creepage of the armor units 4 and this may be most efficiently attained by the use, as just stated, of the oppositely-inclined threads upon these two rods.

The turnbuckle 8 is provided at its ends with the flanges 13, with which impinge jam-nuts 14.

Each armor unit is provided with a pair of armor plates 15, each of which has projecting outwardly therefrom and perpendicular thereto, a flange 16, the center pair of which flanges abut each other as best seen in Fig. 1. These flanges 16 are about a quarter of an inch in height or projection away from their respective plates 15, and are therefore adapted to prevent skidding. The space between straps 10 is preferably about an inch and three-quarters.

The plates 15 are riveted by rivets 17 to the leather or fabric body of unit 4, and when the flanges 16 have been worn down to the same height of projection from plates 15, as flanges 16, the rivets 17 likewise engage the road and must be worn down before wear reaches plates 15.

Preferably interposed between the main body of each armor unit 4 and the plates 15, is a fabric washer 18.

Tongues 19 are attached by rivets 20 to the main body of unit 4.

Rivets 21 and washers 22 are so located on the main body of unit 4 that they protect the fabric or leather of which the same is composed, from wear upon the side of ruts or tires smaller in circumference than the tires upon which this armor is used. The size of tires upon which this armor can be used is immaterial, and it may be used upon all sizes; but if used upon a size larger than ruts in the road made by other tires, rivets 21 and washers 22 will prevent wear upon the body of the armor units 4 until rivets 21 and washers 22 are worn out.

The attempt has heretofore been made to hold armor units, of different construction from those herein shown and described, upon a wheel by the use of separable plates or pieces, but this has been found especially objectionable in the case of flat tires, because complete distention of the tire is necessary to hold the said loose pieces in place. When the tire becomes flat these loose pieces fall out and are lost upon the road, and new ones have to be bought in their place. In this invention the armor units 4 are held in such manner upon the rods 5 and 6, and fastened thereto, that they cannot get loose on account of a flat tire or other reason, but must, when desired, be removed therefrom by hand.

The rivets 21 and 17 are preferably round-headed rivets, the heads of which project a material distance outwardly and form a wearing surface of considerable endurance.

Hooks 12 impinge against flanges 13 and on the turnbuckle 8 and prevent movement of the armor unit or units opposite the turnbuckle 8, or turnbuckles 8, in either direction.

The flanges 16 are preferably more or less sharp.

Having thus described this invention, I hereby reserve the benefit of all changes in form, arrangement, order, or use of parts, as it is evident that many minor changes may be made therein without departing from the spirit of this invention or the scope of the following claims.

I claim

1. Tire armor, composed of spaced apart units, rods for attachment of the same to the wheel, and means for attaching each unit to the said rods, one of the said rods being threaded, and the engaging part of each unit being threaded to match.

2. Tire armor, composed of spaced apart units, rods for attachment of the same to the wheel, means for attaching each unit to the said rods, one of the said rods being threaded, and the engaging part of each unit being threaded to match, and a turnbuckle for joining the opposite ends of the said rods.

3. Tire armor, comprising a pair of rods, one of said rods being threaded, turnbuckles for uniting the ends of the rods and a plurality of armor units attached to the said rods; the said means of attachment for the units opposite the turnbuckles being such as to permit turning of the turnbuckles in either direction.

4. Tire armor, comprising a pair of rods, one of said rods being threaded, turnbuckles for uniting the rods and a plurality of armor units attached to the said rods; the said means of attachment for the units opposite the turnbuckles being such as to permit turning of the turnbuckles in either direction, and consisting of a hook attached to such unit.

5. Tire armor, comprising a pair of rods, one threaded, turnbuckles for uniting the rods and a plurality of armor units attached to the said rods; the said means of attachment for the unit or units opposite the turnbuckles being such as to permit turning of the turnbuckles in either direction, and consisting of a hook attached to such unit, the said hook impinging against a flange upon one of the turnbuckles.

6. Tire armor, comprising a pair of oppositely threaded rods, turnbuckles adapted to draw the ends of their respective rods together and to fasten the same, and a plurality of armor units having lugs terminating in threaded eyes, the threads within the said eyes being adapted for engagement with the one of the said rods similarly threaded.

In testimony whereof I hereunto affix my signature.

ADOLPH X. PFEIFFER.

Copies of this patent may be obtained for five cents each, by addressing the "Commissioner of Patents, Washington, D. C."